US012634162B2

(12) United States Patent
Lee et al.

(10) Patent No.: US 12,634,162 B2
(45) Date of Patent: May 19, 2026

(54) ARTIFICIAL INTELLIGENCE (AI) SYSTEM FOR HANDLING A QUERY ABOUT A CONVERSATION IN A VIDEOCONFERENCING MEETING

(71) Applicant: Zoom Video Communications, Inc., San Jose, CA (US)

(72) Inventors: Bilung Lee, Irvine, CA (US); Vijay Venkataswamy Parthasarathy, San Jose, CA (US); Renjie Tao, Santa Clara, CA (US); Sasank Vemuri, Pflugerville, TX (US)

(73) Assignee: Zoom Communications, Inc., San Jose, CA (US)

( * ) Notice: Subject to any disclaimer, the term of this patent is extended or adjusted under 35 U.S.C. 154(b) by 309 days.

(21) Appl. No.: 18/206,137

(22) Filed: Jun. 6, 2023

(65) Prior Publication Data

US 2024/0414017 A1 Dec. 12, 2024

(51) Int. Cl.
H04L 12/18 (2006.01)
G10L 15/26 (2006.01)

(52) U.S. Cl.
CPC .......... H04L 12/1831 (2013.01); G10L 15/26 (2013.01)

(58) Field of Classification Search
CPC ... H04L 12/1831; G10L 15/26; G06F 16/901; G06F 16/90332
See application file for complete search history.

(56) References Cited

U.S. PATENT DOCUMENTS

| | | | |
|---|---|---|---|
| 2010/0228777 A1* | 9/2010 | Imig | G06F 16/285 707/E17.108 |
| 2014/0019443 A1* | 1/2014 | Golshan | G06F 16/9535 707/723 |
| 2015/0278358 A1* | 10/2015 | Abib | G06F 16/9535 707/706 |
| 2020/0065420 A1 | 2/2020 | Scodary | |
| 2022/0207066 A1* | 6/2022 | Gangwar | H04L 51/02 |
| 2023/0147742 A1* | 5/2023 | Ghafourifar | G06F 40/117 707/749 |

(Continued)

FOREIGN PATENT DOCUMENTS

WO 2013/016045 A1 1/2013

OTHER PUBLICATIONS

EP International Search Report and Written Opinion for PCT/US2024/028712 mailed Sep. 2, 2024.

*Primary Examiner* — Phung-Hoang J Nguyen

(74) *Attorney, Agent, or Firm* — Kilpatrick Townsend & Stockton LLP

(57) ABSTRACT

Some examples involve an artificial intelligence (AI) system for handling a query about a conversation, such as a conversation between attendees of a videoconferencing meeting. As one example, the system can receive a query from a user about a conversation between attendees of a videoconferencing meeting. The system can determine a relevant portion of the conversation based on the query, determine an intent of the query by providing the query as input to an intent detection model, and select a machine-learning model from among a group of machine-learning models based on the intent of the query. The system can then provide the relevant portion of the conversation as input to the selected machine-learning model. The machine-learning model can generate an output based on the relevant portion of the conversation. The system can transmit the output to the user in a response to the query.

18 Claims, 8 Drawing Sheets

(56) References Cited

U.S. PATENT DOCUMENTS

| 2023/0169080 A1* | 6/2023 | Iyer | ........................ | G06N 5/045 |
| | | | | 707/756 |
| 2023/0169540 A1* | 6/2023 | Kaddevarmuth | ... | G06F 21/6263 |
| | | | | 705/14.54 |
| 2024/0378223 A1* | 11/2024 | Hamilton | ................ | G06F 16/35 |

* cited by examiner

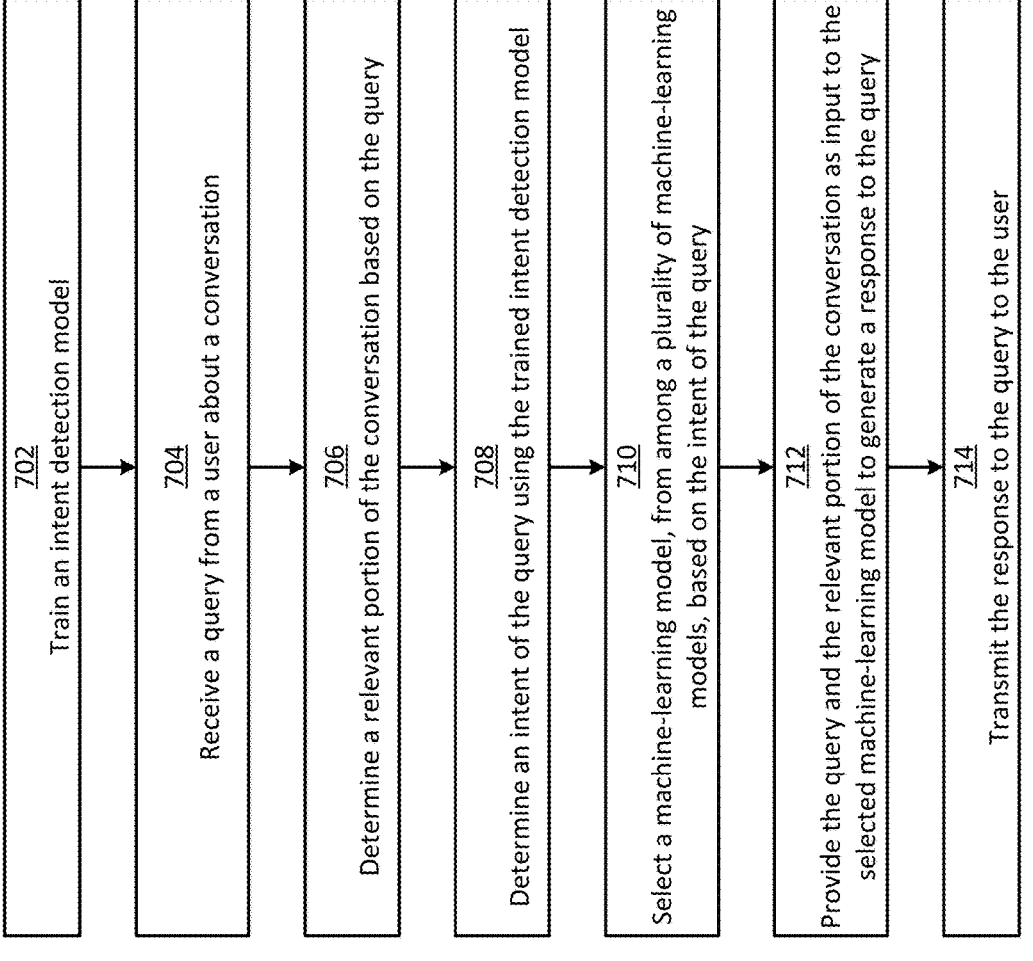

702
Train an intent detection model

704
Receive a query from a user about a conversation

706
Determine a relevant portion of the conversation based on the query

708
Determine an intent of the query using the trained intent detection model

710
Select a machine-learning model, from among a plurality of machine-learning models, based on the intent of the query 712
Provide the query and the relevant portion of the conversation as input to the selected machine-learning model to generate a response to the query 714
Transmit the response to the query to the user

FIG. 7

ARTIFICIAL INTELLIGENCE (AI) SYSTEM FOR HANDLING A QUERY ABOUT A CONVERSATION IN A VIDEOCONFERENCING MEETING

TECHNICAL FIELD

The present application generally relates to query handling and, more particularly, relates to an artificial intelligence (AI) system for handling a query about a conversation, such as a conversation between attendees of a videoconferencing meeting.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

FIG. 7 shows a flowchart of an example of a process for handling a query about a conversation according to some aspects of the present disclosure.

DETAILED DESCRIPTION

Figure 1:
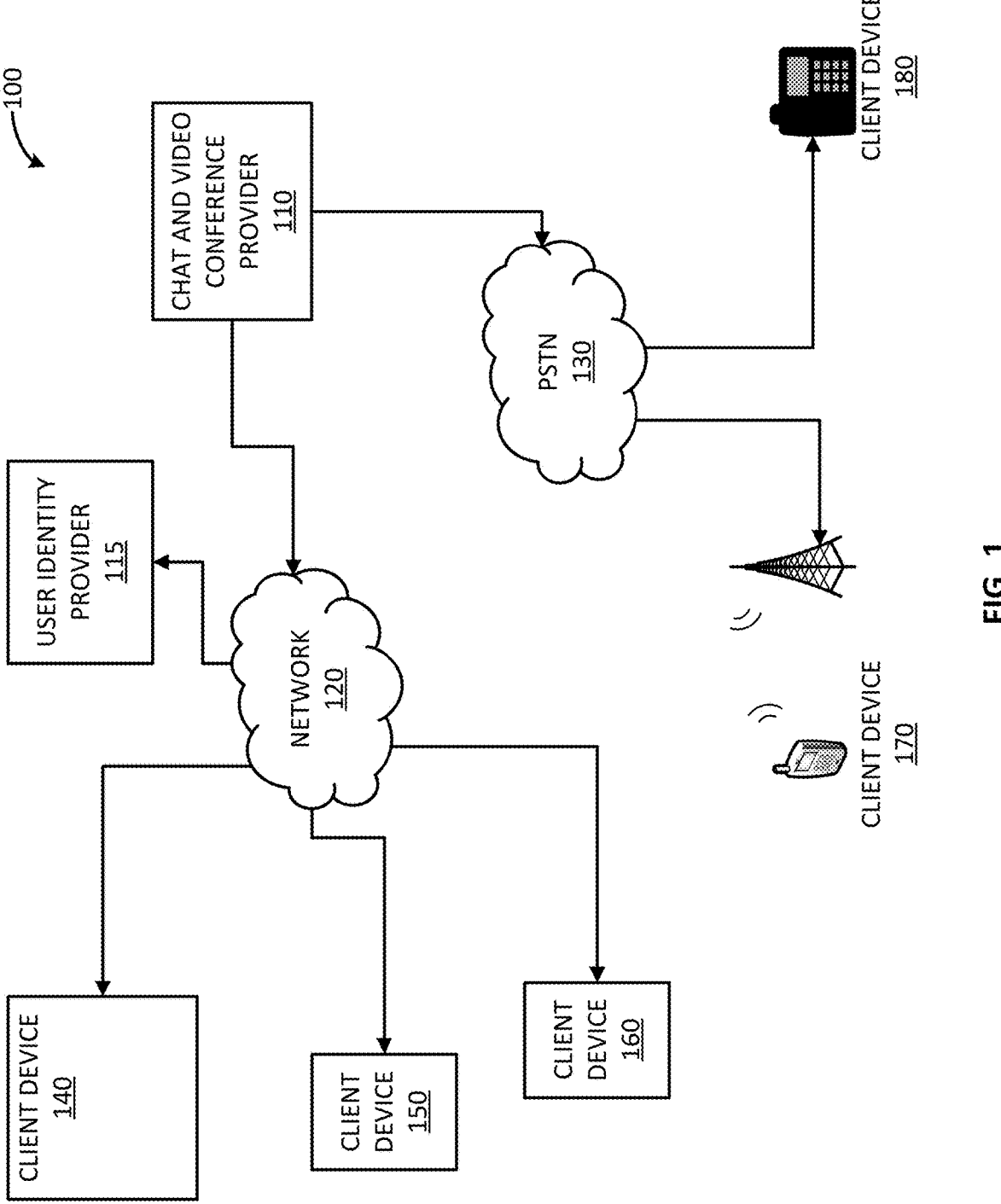
FIG. 1 shows an example of a system for providing videoconferencing and chat functionality to various client devices according to some aspects of the present disclosure.

Examples are described herein in the context of reducing noise in video frames. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, without having to be at the same physical location. Participants can be invited to a videoconference meeting, join from their personal computers or telephones, and are able to see and hear each other and converse largely as they would during an in-person group meeting or event. In particular, the participants receive audio and video streams from the other participants and are presented with views of the video streams and audio from the audio streams. Using these different modalities, the participants can see and hear each other, engage more deeply, and generally have a richer experience despite not being physically in the same space.

In some cases, a person may join a videoconferencing meeting after it has started or, at times, may be distracted during the discussion. In these situations, the person may want to get up-to-speed on any topics under discussion or recap a period of time they missed. For example, a person may join a videoconference 15 minutes after it has started and want to catch up on any topics they missed. Normally, the only way to do so is to ask the other participants about the content that they missed. But this can be annoying and time consuming for the other participants. And if the reason that the participant missed part of the discussion is that they were present but distracted, it may be embarrassing to ask the other participants for a recap.

Additionally, after a videoconferencing meeting has finished, an individual may wish to know what was discussed during the meeting or how people reacted to the topics discussed. The individual may or may not have been a participant in the videoconferencing meeting. For example, a participant in the videoconferencing meeting may forget whether a certain topic was discussed during a videoconferencing meeting that occurred several months ago. If meeting minutes are available, the individual may manually review meeting minutes to learn what was discussed. But this is a manual and time-consuming process that may lack key information. Alternatively, the individual may listen to a recording meeting to learn what was discussed, but this is also manual and time consuming.

Some examples of the present disclosure can overcome the one or more of the abovementioned problems by providing an artificial intelligence (AI) system that allows users to submit queries about a conversation, such as a missed portion of a conversation in a videoconferencing meeting, and provides them with the requested information. By submitting queries to the AI system, a user can quickly and easily learn any desired information about an ongoing or past conversation, without having to interrupt the meeting participants or manually review related logs (e.g., recordings or meeting minutes). For example, a user can submit a query to the AI system about a missed portion of the meeting, such as a request to summarize the missed portion of the meeting. In response, the AI system can provide a summary of the missed portion of the meeting to the user, so that the user does not have to bother the meeting participants.

More specifically, as noted above, a user can submit a query to the AI system, either while a conversation is ongoing or after it has ended, to learn information about the conversation. The queries can be in a natural-language format, so that non-technical users can engage with the AI system. The AI system can intelligently determine how to respond to the query based on the intent of the query, so that the types of answers provided by the AI system are generally in accordance with the intent of the queries. For example, the AI system can use an intent detection model to determine the intent of a query. Based on the intent of the query, the system can then intelligently select which machine-learning model to use, from among a group of machine-learning models, to generate an answer to the query. The AI system can then generate an answer to the query using the selected machine-learning model and provide it back to the user.

To generate an appropriate response to the query, in some examples the AI system can first determine a relevant portion of the conversation based on the query. To do so, the AI system may convert the query into a query embedding, which is an embedding of the query. The AI system may also convert audio of the videoconferencing meeting into a text transcript, and then convert the text transcript into a transcript embedding, which is an embedding of the transcript. Having generated the query embedding and the transcript embedding, the AI system can compare the query embedding to various parts of the transcript embedding (e.g., using approximate nearest neighbor (ANN) techniques) to identify the most relevant portion or portions of the conversation to the query.

The AI system can also determine the intent of the query by providing the query as input to an intent detection model, which can be a trained machine-learning model such as a classifier. In response to the input, the intent detection model output an intent indicator indicating the intent of the query. Based on the intent of the query, the AI system can select a particular machine-learning model from among a group of trained machine-learning models. In some examples, the group of trained machine-learning models may include multiple specialized models and a general model. The specialized models can be used to handle queries with matching intents, whereas the general model can be used as a fallback when none of the specialized models match the query's intent.

After selecting a machine-learning model based on the intent of the query, the AI system can provide the query and the relevant portions of the conversation as input to the selected machine-learning model. In response, the machine-learning model can generate an output based on the query and the relevant portions of the conversation. The AI system can then transmit the output to the user as at least part of a response to the query. Because the response to the query is generated by a machine-learning model that is selected based on the intent of the query, the AI system can provide the type of answer that is most likely sought by the user. In this way, the AI system can allow the user to seek any suitable type of information using natural-language queries and provide intelligent responses.

This illustrative example is given to introduce the reader to the general subject matter discussed herein and the disclosure is not limited to this example. The following sections describe various additional non-limiting examples.

FIG. 1 shows an example of a system 100 for providing videoconferencing and chat functionality to various client devices according to some aspects of the present disclosure. The system 100 includes a chat and videoconference provider 110 that is connected to multiple communication networks 120 and public switched telephone network (PSTN) 130, through which various client devices 140-180 can participate in videoconferences hosted by the chat and videoconference provider 110. For example, the chat and videoconference provider 110 can be located within a private network to provide video conferencing services to devices within the private network, or it can be connected to a public network, e.g., the internet, so it may be accessed by anyone. Some examples may even provide a hybrid model in which a chat and videoconference provider 110 may supply components to enable a private organization to host private internal videoconferences or to connect its system to the chat and videoconference provider 110 over a public network.

It should be understood that in some examples, the chat and videoconference provider 110 may be a chat provider providing only a chat functionality, while in other example examples, the chat and videoconference provider 110 may be a videoconference provider providing only video conferencing functionality. Furthermore, although the chat and videoconference provider 110 are shown as one entity, other configurations are considered. For example, a chat provider may have a structure similar to that of chat and videoconference provider 110, and a videoconference provider may also have a structure similar to the chat and videoconference provider 110. The chat provider and the videoconference provider may be connected through the same network (e.g., the network 120), or may be operable to communicate with each other through another shared network.

The system optionally also includes one or more user identity providers, e.g., user identity provider 115, which can provide user identity services to users of the client devices 140-160 and may authenticate user identities of one or more users to the chat and videoconference provider 110. In this example, the user identity provider 115 is operated by a different entity than the chat and videoconference provider 110, though in some examples, they may be the same entity.

In some examples, the chat and videoconference provider 110 may provide a chat functionality. In such examples, the chat and videoconference provider 110 may allow a user to create one or more chat channels where the user may exchange messages with other users that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and videoconference provider 110 may provide permission to a user and/or an owner of the chat channel may provide permission to the user. Furthermore, there may be any number of users permitted in the chat channel.

Figure 2:
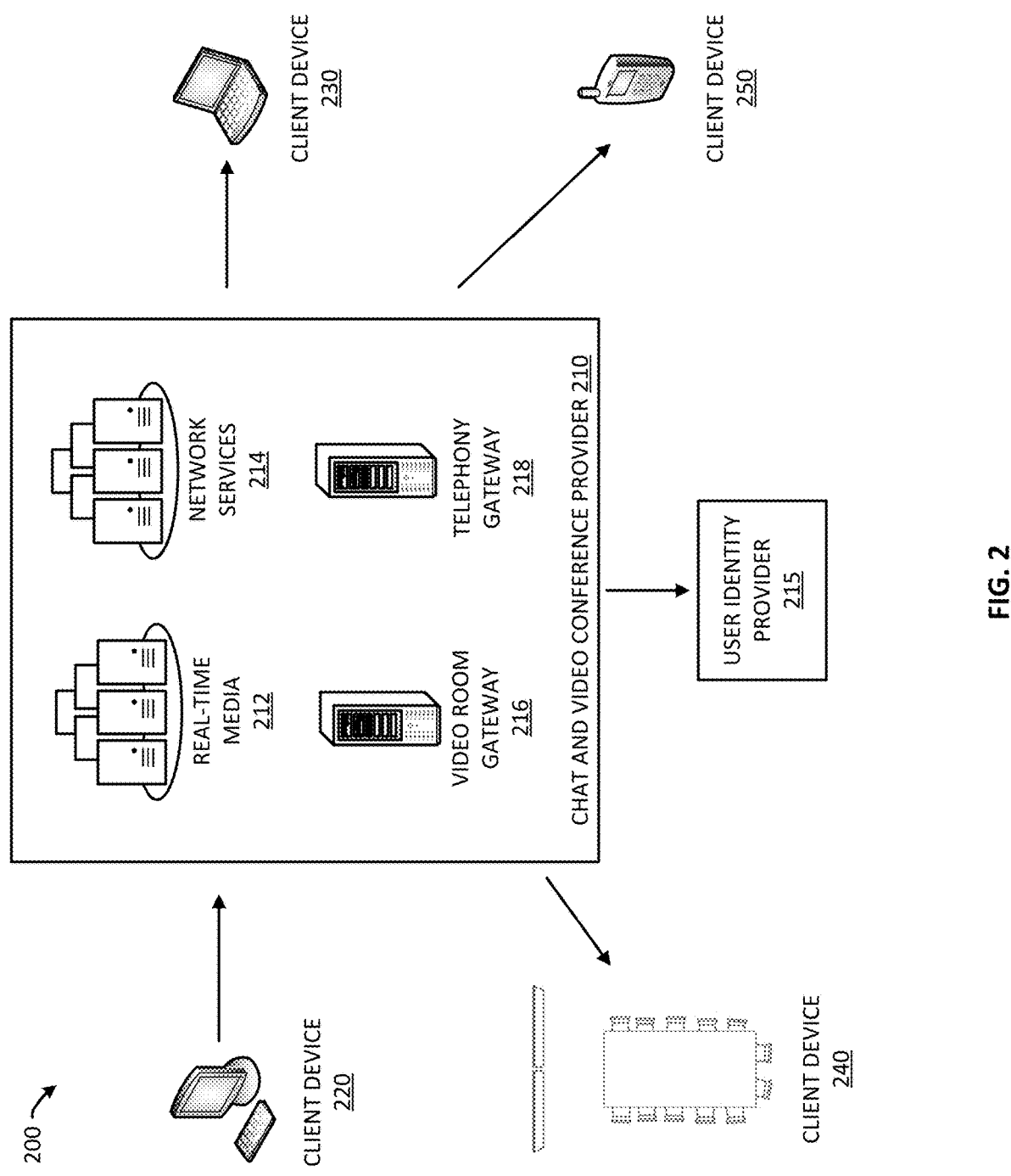
FIG. 2 shows another example of a system for providing videoconferencing and chat functionality to various client device according to some aspects of the present disclosure.

The chat and videoconference provider 110 may also provide video conferencing functionality. For example, the chat and videoconference provider 110 may allow clients to create videoconference meetings (or "meetings") and invite others to participate in those meetings as well as perform other related functionality, such as recording the meetings, generating transcripts from meeting audio, manage user functionality in the meetings, enable text messaging during the meetings, etc. FIG. 2, described below, provides a more detailed description of the architecture and functionality of the chat and videoconference provider 110.

Meetings in this example chat and videoconference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

Chat channels may be provided by the chat and videoconference provider 110 to which participants are connected. Similar to the meetings discussed above, the chat channels are constructs provided by a server where the messages are received then directed to the various participants. The messages may include text, audio files, video files, image files, or any other electronic file type.

To create a meeting with the chat and videoconference provider 110, a user may contact the chat and videoconference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the chat and videoconference provider 110 may prompt the user for certain information, such as a date, time, and duration for the meeting, a number of participants, a type of encryption to use, whether the meeting is confidential or open to the public, etc. After receiving the various meeting settings, the chat and videoconference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The chat and videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the chat and videoconference provider 110. The client devices also receive audio or video information from the chat and videoconference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The chat and videoconference provider 110 may also invalidate the meeting information, such as the meeting identifier or password/ passcode.

The chat and videoconference provider 110 may use a similar process as is used to create a meeting to create a chat channel. A user may contact the chat and videoconference provider 110 using a client device 140-180 and select an option to create a chat channel. Such an option may be provided in a webpage accessed by a client device 140-160 or client application executed by a client device 140-160. To create the chat channel, the chat and videoconference provider 110 may prompt the user for certain information, a number of participants, a type of encryption to use, whether the chat channel is confidential or open to anyone, a title or subject, etc. After receiving the various chat channel settings, the chat and videoconference provider may create a record for the chat channel and generate a chat identifier to one or more user invited to the chat channel. In some examples, the certain information associated with the chat channel may be automatically generated by the chat and videoconference provider 110.

To provide such functionality, one or more client devices 140-180 may communicate with the chat and videoconference provider 110 using one or more communication networks, such as network 120 or the PSTN 130. The client devices 140-180 may be any suitable computing or communications device that have audio or video capability. For example, client devices 140-160 may be conventional computing devices, such as desktop or laptop computers having processors and computer-readable media, connected to the chat and videoconference provider 110 using the internet or other suitable computer network. Suitable networks include the internet, any LAN, MAN, WAN, cellular network (e.g., 3G, 4G, 4G LTE, 5G, etc.), or any combination of these. Other types of computing devices may be used instead or as well, such as tablets and/or smartphones.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and videoconference provider 110. It should be appreciated that certain computing devices may also provide telephony functionality and may operate as telephony devices. For example, smartphones typically provide cellular telephone capabilities and thus may operate as telephony devices in the system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these client devices 140-160 contact the chat and videoconference provider 110 using network 120 and may provide information to the chat and videoconference provider 110 to access functionality provided by the chat and videoconference provider 110, such as access to create new meetings/chat channels or join existing meetings/chat channels. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and videoconference provider 110.

A user identity provider 115 may be any entity trusted by the chat and videoconference provider 110 that can help identify a user to the chat and videoconference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as two-factor authentication. However, identities may be distinct from functionality such as email. For example, a healthcare provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and videoconference provider 110.

When the user accesses the chat and videoconference provider 110 using a client device, the chat and videoconference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and videoconference provider 110 either provides or denies access to its services, respectively.

For telephony devices, e.g., client devices 170-180, the user may place a telephone call to the chat and videoconference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and videoconference provider 110. For example, telephony devices may be unable to provide user identification information to identify the telephony device or the user to the chat and videoconference provider 110. Thus, the chat and videoconference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak or share content in a meeting or chat, hear or view certain content shared in the meeting, or access other meeting functionality.

It should be appreciated that users may choose to participate in meetings anonymously and decline to provide user identification information to the chat and videoconference provider 110, even in cases where the user has an authenticated identity and employs a client device capable of identifying the user to the chat and videoconference provider 110. The chat and videoconference provider 110 may determine whether to allow such anonymous users to use services provided by the chat and videoconference provider 110. Anonymous users, regardless of the reason for anonymity, may be restricted as discussed above with respect to users employing telephony devices, and in some cases may be prevented from accessing certain meetings or other services, or may be entirely prevented from accessing the chat and videoconference provider 110.

Referring again to chat and videoconference provider 110, in some examples, it may allow client devices 140-160 to encrypt their respective chat and/or video and audio streams to help improve privacy in their meetings. Encryption may be provided between the client devices 140-160 and the chat and videoconference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and videoconference provider 110, while allowing the chat and videoconference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and videoconference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and videoconference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Now referring to FIG. 2, shown is an example of a system 200 in which a chat and videoconference provider 210 provides videoconferencing functionality to various client devices 220-250 according to some aspects of the present disclosure. The client devices 220-250 include two conventional computing devices 220-230, dedicated equipment for a videoconference room 240, and a telephony device 250. Each client device 220-250 communicates with the chat and videoconference provider 210 over a communications network, such as the internet for client devices 220-240 or the PSTN for client device 250, generally as described above with respect to FIG. 1. The chat and videoconference provider 210 is also in communication with one or more user identity providers 215, which can authenticate various users to the chat and videoconference provider 210 generally as described above with respect to FIG. 1.

In this example, the chat and videoconference provider 210 employs multiple different servers (or groups of servers) to provide different chat and/or videoconference functionality, thereby enabling the various client devices to create and participate in chat channels and/or videoconference meetings. The chat and videoconference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more chat channels and/or videoconference meetings to the client devices 220-250.

The real-time media servers 212 provide multiplexed multimedia streams to meeting participants, such as the client devices 220-250 shown in FIG. 2. While chat and/or video and audio streams typically originate at the respective client devices, they are transmitted from the client devices 220-250 to the chat and videoconference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various chat and/or video and audio streams based on the target client device and communicate multiplexed streams to each client device. For example, the real-time media servers 212 receive chat and/or audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the chat and/or audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the chat and videoconference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and videoconference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and videoconference provider 210 may allow a meeting participant to notify it of inappropriate behavior or content in a meeting. Such a notification may trigger the real-time media servers to 212 record a portion of the meeting for review by the chat and videoconference provider 210. Still other functionality may be implemented to take actions based on the decrypted multimedia streams at the chat and videoconference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and videoconference provider 210 via local real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the chat and videoconference provider 210 and across many different real-time media servers 212.

Turning to the network services servers 214, these network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and videoconference provider under a supervisory set of servers. When a client device 220-250 accesses the chat and videoconference provider 210, it will typically communicate with one or more network services servers 214 to access their account or to participate in a meeting.

When a client device 220-250 first contacts the chat and videoconference provider 210 in this example, it is routed to a network services server 214. The client device may then provide access credentials for a user, e.g., a username and password or single sign-on credentials, to gain authenticated access to the chat and videoconference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and videoconference provider 210, or scheduling a new meeting, by interacting with the network services servers 214.

In some examples, users may access the chat and videoconference provider 210 anonymously. When communicating anonymously, a client device 220-250 may communicate with one or more network services servers 214 but only provide information to create or join a meeting, depending on what features the chat and videoconference provider allows for anonymous users. For example, an anonymous user may access the chat and videoconference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

The chat and videoconference provider 210 may use a similar process to that which is used to schedule a meeting (as described above) to create a chat channel. A user may contact the chat and videoconference provider 210 using a client device 220 and select an option to create a chat channel. After receiving various chat channel settings (e.g. a title, a participant list, etc.), the chat and videoconference provider may create a record for the chat channel and generate a chat identifier to invite one or more users to the chat channel. In some examples, the certain information associated with the chat channel may be automatically generated by the chat and videoconference provider 210.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting and/or a chat channel, client devices will send and receive multimedia streams via the real-time media servers 212, but they may also communicate with the network services servers 214 as needed during meetings. For example, if the host leaves the meeting or chat channel, the network services server(s) 214 may appoint another user as the new meeting host and assign host administrative privileges to that user. Hosts may have administrative privileges to allow them to manage their chat channels and/or meetings, such as by enabling or disabling screen sharing, muting or removing users from the meeting, assigning or moving users to the chat channel or meeting, recording meetings, etc. Such functionality may be managed by the network services server(s) 214.

For example, if a host wishes to remove a user from a chat channel, they may identify the user and issue a command through a user interface on their client device. The command may be sent to a network services server 214, which may then disconnect the identified user from the corresponding real-time media server 212. If the host wishes to move one or more participants into a meeting or chat channel, such a command may also be handled by a network services server 214, which may provide authentication information to the one or more participants for joining the chat channel and then connect the one or more participants to the chat channel. In some examples, a chat channel may not have a host.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request. Similar steps may be taken for ending a chat channel. For example, after receiving a command to terminate a chat channel, the network services server 214 communicate with the real time media server(s) 212 to stop a messaging service for the chat channel and remove any users from the chat channel records.

Depending on the functionality provided by the chat and videoconference provider, the network services server(s) 214 may provide additional functionality, such as by providing private chat and meeting capabilities for organizations, special types of meetings (e.g., webinars), etc. Such functionality may be provided according to various examples of chat and video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive chat and/or video and audio streams from each of the cameras and microphones and connect with the chat and videoconference provider 210. For example, the video conferencing hardware may be provided by the chat and videoconference provider to one or more of its subscribers, which may provide access credentials to the video conferencing hardware to use to connect to the chat and videoconference provider 210.

The video room gateway servers 216 provide specialized authentication and communication with the dedicated video conferencing hardware that may not be available to other client devices 220-230, 250. For example, the video conferencing hardware may register with the chat and videoconference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and videoconference provider 210.

Referring now to the telephony gateway servers 218, these servers 218 enable and facilitate telephony devices' participation in meetings hosed by the chat and videoconference provider 210. Because telephony devices communicate using the PSTN and not using computer networking protocols, such as TCP/IP, the telephony gateway servers 218 act as an interface that converts between the PSTN and the networking system used by the chat and videoconference provider 210.

For example, if a user uses a telephony device to connect to a meeting, they may dial a phone number corresponding to one of the chat and videoconference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and videoconference provider 210 discussed above are merely examples of such devices and an example architecture. Some chat and videoconference providers may provide more or less functionality than described above and may not separate functionality into different types of servers as discussed above. Instead, any suitable servers and network architectures may be used according to different examples.

Figure 3:
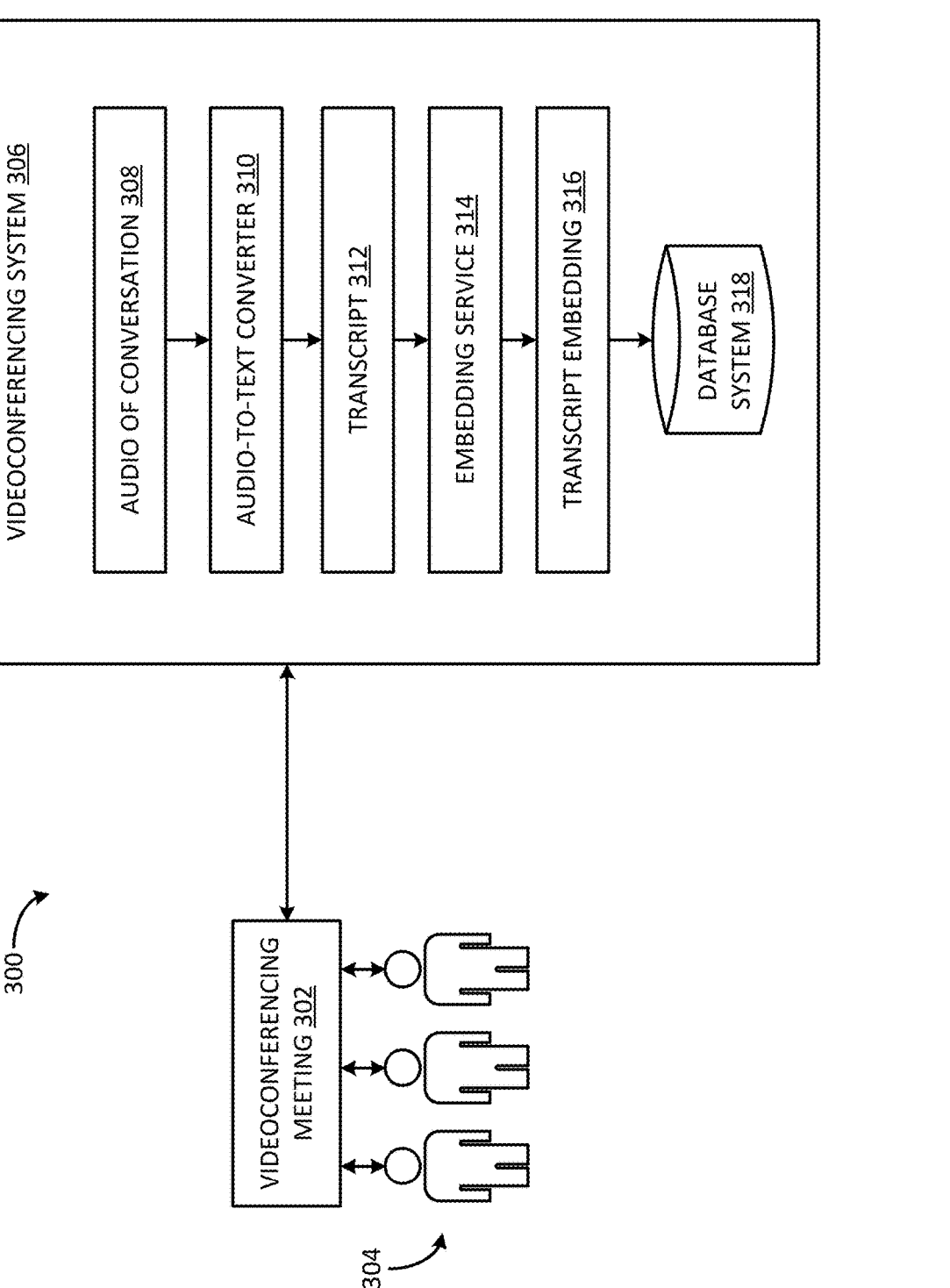
FIG. 3 shows a block diagram of an example of a system for generating a transcript embedding associated with a conversation according to some aspects of the present disclosure.

FIG. 3 shows a block diagram of an example of a system 300 for generating a transcript embedding associated with a conversation according to some aspects of the present disclosure. The system 300 can include a videoconferencing meeting 302 in which various attendees 304 participate in a conversation. For example, the attendees 304 can be engaged in a spoken discussion about a particular topic via audio streams transmitted among their client devices. The videoconferencing meeting 302 can be facilitated by a videoconferencing system 306. For example, the participants' audio and video streams may be routed through the videoconferencing system 306 to each other's client devices. The videoconferencing system 306 may be similar to any of the chat and videoconferencing providers described above.

During or after the videoconferencing meeting 302, the videoconferencing system 306 can obtain the audio 308 of the conversation and execute an audio-to-text converter 310 to convert the audio 308 into a text transcript 312. The audio 308 can include some or all of the audio streams from some or all of the attendees 304 (e.g., participants) of the videoconferencing meeting 302. Examples of the audio-to-text converter 310 can include any suitable speech-to-text conversion software, such as DeepSpeech, Kaldi, Wav2letter, or Coqui. If the conversation is still ongoing, the transcript 312 may span just the portion of the conversation that has occurred so far. If the conversation has ended, the transcript 312 may span the entire conversation. The transcript 312 can be in a textual format and include the words spoken during the conversation.

After generating the transcript 312, the videoconferencing system 306 can provide the transcript 312 to an embedding service 314. The embedding service 314 can generate an embedding of the transcript 312, known hereinafter as a transcript embedding 316. The transcript embedding 316 is a numerical representation (e.g., a vector representation) of the transcript 312. Since the transcript 312 is in text form, it may not be easily searchable, storable, or usable with certain models. Generating an embedding representation of the transcript 312 can help resolve those issues.

The embedding service 314 is configured to generate embeddings of inputs. An embedding is a numerical representation of the input. In some examples, the embedding service 314 can include an embedding model. An embedding model is a trained machine-learning model that is configured to output an embedding of an input. One example of an embedding model can include a sentence-transformer model such as "all-MiniLM-L6-v2," which can map sentences and paragraphs to a 384-dimensional vector space. Another example can include a Python package called "embeddings 0.0.8," which provides pretrained word embeddings for natural-language processing and machine learning. Yet another example be a Python package called "Word2vec". The embedding model can be trained to learn word associations from a large corpus of text. Each distinct word in the corpus can be represented as a corresponding vector in a vector space, which may have hundreds or thousands of dimensions. Upon receiving a text input, the embedding model can determine and output an embedding representation of the text input using these learned associations and vectors.

Once generated, the transcript embedding 316 can be stored in a database system 318, which may be internal or external to the videoconferencing system 306. In some examples, the database system 318 can include a vector storage and search system, which may be configured to index and search for vectors using approximate nearest neighbor (ANN) techniques. The vector storage and search system can include a vector database, which may be specifically configured to store and operate on vectors. For example, the vector database can index vectors using one or more indexing algorithms, such as a product quantization (PQ) algorithm, a locality-sensitive hashing (LSH) algorithm, or a hierarchical navigable small world (HNSW) algorithm. This can map the vectors to a data structure that enables faster searching. The vector storage and search system can also include a search algorithm. The search algorithm can be configured to apply a similarity measure to find one or more stored vectors in the vector database that is most similar to a query. For example, the search algorithm can apply a similarity measure to determine how similar a set of stored vectors (in the vector database) are to query vector. Different types of similarity measures can be used depending on the implementation, such as cosine similarity, Euclidean distance, and dot product similarity. After the transcript embedding 316 has been stored in the database system 318, it may be queried for relevant information as described below.

Figure 4:
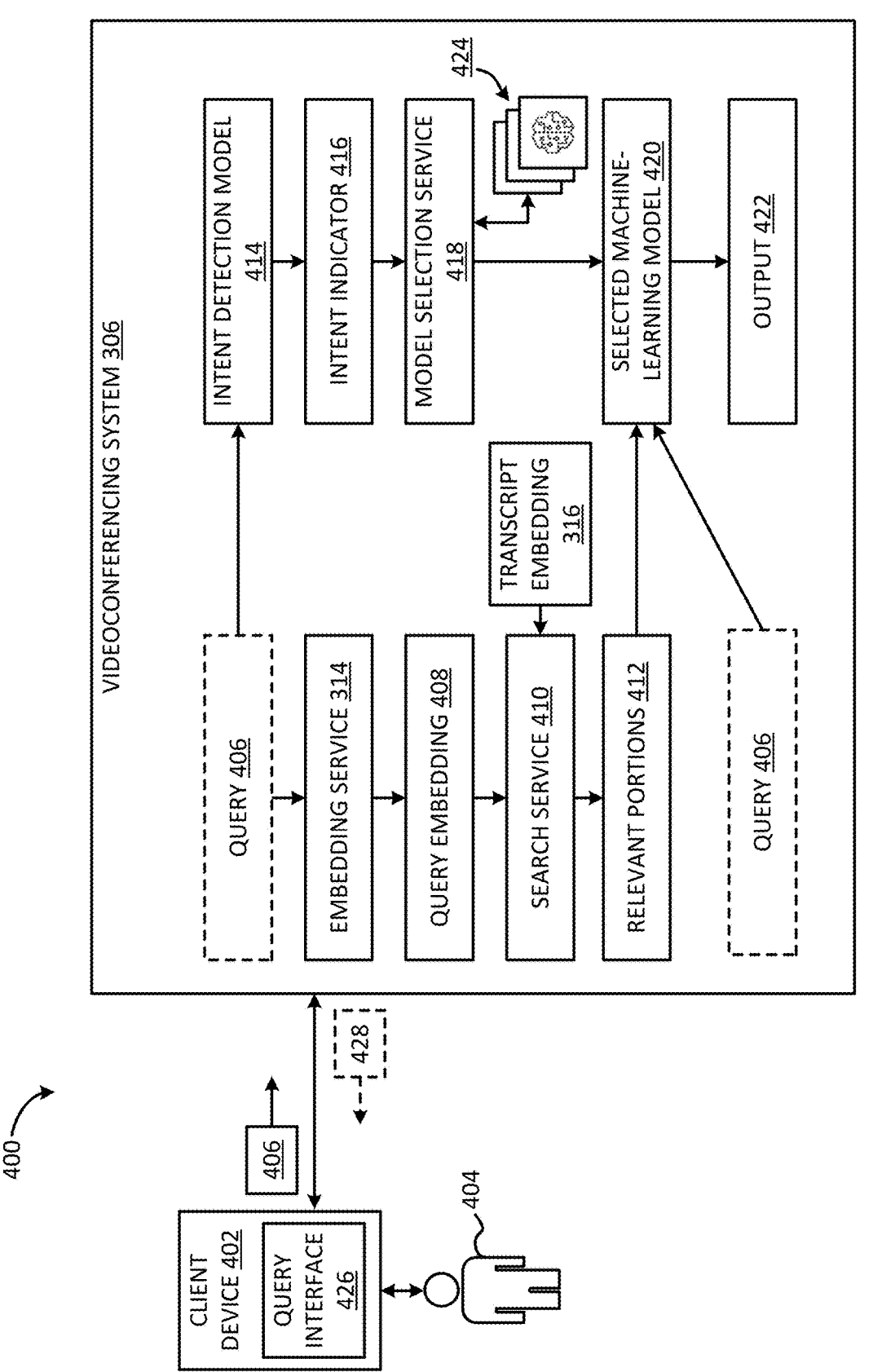
FIG. 4 shows a block diagram of an example of a system for handling a query about a conversation according to some aspects of the present disclosure.

FIG. 4 shows a block diagram of an example of a system 400 for handling a query 406 about a conversation according to some aspects of the present disclosure. The system 400 includes a client device 402 operated by a user 404, which may have been a participant in the conversation or may not have been a participant in the conversation. Examples of the client device 402 can include a desktop computer, a laptop computer, a tablet, an e-reader, a mobile phone, or a wearable device (e.g., a smart watch). The client device 402 may correspond to any of the client devices described above.

The user 404 can input a query 406 into a query interface 426, which is output on their client device 402. The query 406 can be in a natural language format and, in some examples, a question format. The query 406 can be a request for one or more types information about an ongoing or completed conversation associated with a videoconferencing meeting. One example of the query 406 may be, "Did [Participant A] speak about [Topic X]?". Thus, the user 404 can request information about whether certain participants spoke about certain topics. Another example of the query 406 may be, "Can you summarize the last [N minutes] of the conversation?" Thus, the user 404 can request summaries of some or all of the conversation. Another example of the query may be, "How did the participants react to the news about the new manager?" Thus, the user 404 can request sentiment information related to the conversation, such as the participants' emotional reaction to a certain portion of the conversation. Yet another example of the query may be, "Did the participants seem engaged in the conversation?" Thus, the user 404 can request engagement information related to the conversation, such as the participants' engagement during a certain portion of the conversation. The user 404 may alternatively request other types of information in the query 406.

The query interface 426 can be configured to receive an input query from the user 404. The query interface 426 can be a graphical user interface that includes one or more graphical input elements (e.g., text box, check boxes, radio buttons, or other form fields) for receiving the input query from the user 404. In some examples, the query interface 426 may be part of a videoconferencing interface on the client device 402. This may allow the user 404 to issue queries while participating in an ongoing videoconferencing meeting. For instance, the query interface 426 can be an input box within a videoconferencing interface (e.g., output on the client device 402), through which the user 404 is currently participating in a videoconferencing meeting. As usual, the videoconferencing interface can also show the other participants of the videoconferencing meeting (e.g., their video streams) and provide other related functionality, such as desktop sharing and a text chat. In other examples, the query interface 426 may be separate from the videoconferencing interface. For instance, the query interface 426 can be part of a webpage that is accessible via the client device 402. The webpage may be provided by the videoconferencing system 306. The user 404 can access the webpage using a browser or another application to interact with the query interface 426.

After receiving the query 406 from the user 404, the query interface 426 can provide the query 406 to the videoconferencing system 306 for processing. For example, the client device 402 that includes the query interface 426 can transmit the query 406 to the videoconferencing system 306 via one or more networks, such as the Internet. The videoconferencing system 306 can receive the query 406 and perform a bifurcated process based on the query 406. The two parts of the bifurcated process can be performed in sequence or in parallel.

The first part of the bifurcated process can involve the videoconferencing system 306 generating a query embedding 408 representing the query 406 using the embedding service 314. For example, the videoconferencing system 306 can provide the query 406 as input to the embedding service 314 to receive the corresponding query embedding 408 as output. The query embedding 408 is a numerical representation of the query 406. For example, the query embedding 408 can be a vector representation of the words in the query 406.

After generating the query embedding 408, the videoconferencing system 306 can provide the query embedding 408 as input to a search service 410. The search service 410 can be configured to determine one or more portions of the conversation that are most relevant to the query 406. Those portions can be referred to herein as relevant portions 412. For example, the search service 410 can compare the query embedding 408 to a transcript embedding 316, which may have previously been generated based on a transcript 312 of the conversation using the process shown in FIG. 3. By performing this comparison, the search service 410 can determine which portions of the transcript embedding 316 are most similar to the query embedding 408. This may involve computing a similarity measure for various portions of the transcript embedding 316, where the similarity measure indicates the similarity between each respective portion of the transcript embedding 316 and the query embedding 408. Portions with similarity measures that exceed a predefined threshold may be deemed relevant portions 412. In some examples, the search service 410 may be part of the vector storage and search system described above with respect to FIG. 3, and employ the search algorithm described above, to identify the relevant portions 412 of the conversation.

Other techniques may additionally or alternatively be used to determine which portion or portions of the conversation are most relevant to the query 406. For instance, some examples may forego creating the transcript embedding 316 and the query embedding 408. In some such examples, the search service 410 can compare keywords in the query 406 to the text of the transcript 312 to identify which portions of the transcript 312 are relevant to the query 406.

A second portion of the bifurcated process can involve providing the query 406 as input to an intent detection model 414. The intent detection model 414 can be configured to determine an intent of the query 406. The "intent" of a query can be its purpose or objective, in terms of the type of answer sought by the user 404 (e.g., the intended format of the answer). For example, if the query 406 is "Did [Participant A] speak about [Topic X]?", then the intent of the query 406 may be to receive a yes or no answer about whether the specified participant spoke about the specified topic. If the query 406 is, "Can you summarize the last [N minutes] of the conversation?", then the intent of the query 406 may be to receive a textual summary of the selected content. If the query 406 is, "How did the participants react to the news about the new manager?", then the intent of the query 406 may be to receive a description of the sentiment of each participant when they heard the news. If the query 406 is, "Did the participants seem engaged in the conversation?", then the intent of the query 406 may be to receive a description of the engagement of the participants during at least a portion of the conversation.

The intent detection model 414 can be a trained machine-learning model, such as a deep neural network or a classifier. Examples of such a classifier can include a support vector machine, a Naive Bayes classifier, or a k-means classifier. The intent detection model 414 can be trained using a supervised learning process based on labeled training data, such as training data that includes sample queries labeled with corresponding intents. When the intent detection model 414 is a classifier, the intent detection model 414 can be configured to classify an input query into a particular category among a set of predefined categories. Each predefined category can correspond to an intent. For example, the intent detection model 414 can be configured to classify an input query into a "presence" category, a "summarization" category, a "sentiment" category, an "engagement" category, or an "other" category. The input query may be classified into the "presence" category if it is asking whether certain content is present in the conversation, such as whether a particular participant spoke about a particular topic. The input query may be classified into the "summarization" category if it is asking to summarize content from the conversation. The input query may be classified into the "sentiment" category if it is asking about peoples' emotional reactions to at least a portion of the conversation. The input query may be classified into the "engagement" category if it is asking about peoples' engagement with respect to at least a portion of the conversation. The input query may be classified into the "other" category if none of the other categories fit the query. Of course, those particular categories are intended to be illustrative and non-limiting. Other examples may involve more, fewer, or different categories depending on the configuration.

After determining the intent of the input query, the intent detection model 414 can output an intent indicator indicating the intent of the input query. For example, the intent detection model 414 can generate an intent indicator 416 indicating the intent of the query 406. The intent indicator 416 may have any suitable form. For example, the intent indicator 416 can include a unique identifier (e.g., a unique number) of the category into which the query 406 was classified, which in turn can indicate the intent of the query 406.

Next, the videoconferencing system 306 can provide the intent indicator 416 as input to a model selection service 418. Based on the intent indicator 416, the model selection service 418 can select a trained machine-learning model 420 from among a group of trained machine-learning models 424. In some examples, the group of trained machine-learning models can include one or more specialized models. A specialized model is a machine-learning model that is specifically configured to perform a specific type of task (e.g., it is trained to perform the specific task using specialized training data designed for that task). For example, the group of trained machine-learning models 424 can include a presence model, a summarization model, a sentiment model, and an engagement model. The presence model can be trained to detect the presence of selected information in the relevant portions 412 of the conversation. The summarization model can be trained to summarize the relevant portions 412 of the conversation. The sentiment model can be trained to detect the sentiment associated with the relevant portions 412 of the conversation. The engagement model can be trained to detect the level of engagement (e.g., participant participation or interest) associated with the relevant portions 412 of the conversation. In some examples, the group of trained machine-learning models 424 can also include a general model. The general model may be a large-language model, such as a generative pre-trained transformer (GPT) model. The general model can be configured to perform multiple types of tasks (e.g., it is trained to more generally perform multiple types of tasks using more-generalized training data). Because the general model may be larger in size and trained on more general data than the specialized models, the general model may take longer and consume more computing resources (e.g., processing power and memory) to execute, and may provide less accurate results, than the specialized models. It may therefore be desirable to only use the general model as a fallback when a suitable specialized model cannot be identified to handle the query. Thus, in some examples, the general model can be selected as a default or fallback model when none of the specialized models match the intent of the query.

Figure 5:
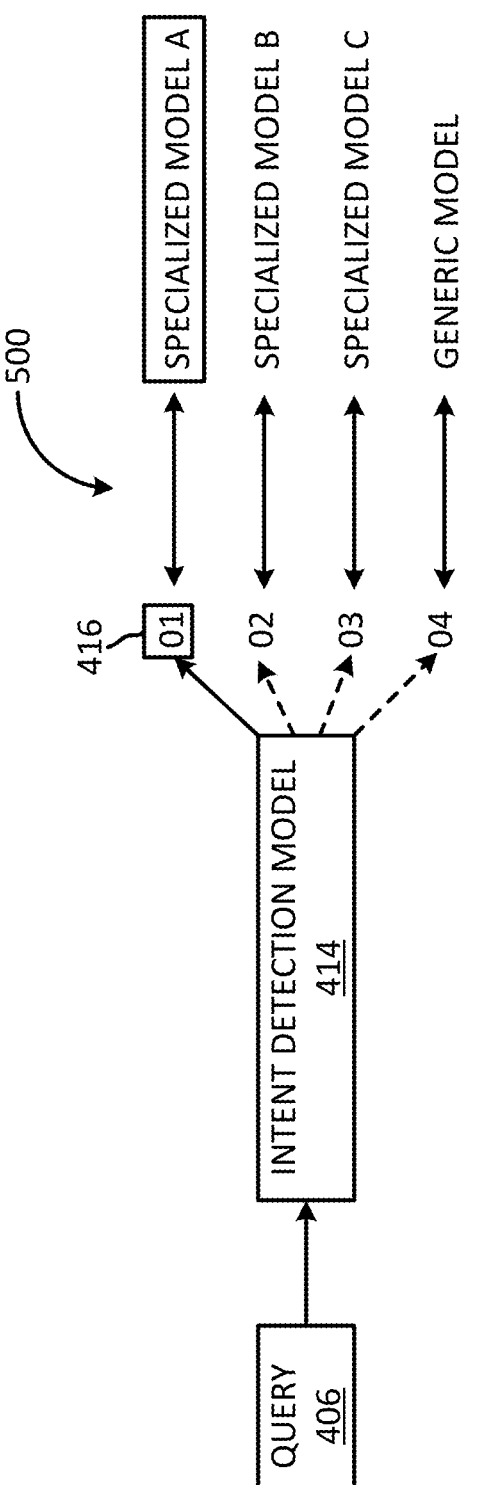
FIG. 5 shows an example of a process for using an intent indicator to select a machine-learning model according to some aspects of the present disclosure.

The model selection service 418 can select a machine-learning model 420, from among the group of trained machine-learning models 424, using any suitable approach. For example, the model selection service 418 can include a predefined mapping that correlates intent indicators to trained machine-learning models 424. Each intent indicator can be correlated, in the predefined mapping, to one of the trained machine-learning models 424. Using the predefined mapping, the model selection service 418 can determine which machine-learning model corresponds to the intent indicator 416. An example of this process is shown in FIG. 5. As shown, the query 406 is input to the intent detection model 414, which can output a corresponding intent indicator 416. In this example, the intent indicator 416 is "01". This may uniquely identify a certain intent, such as summarization. But in other examples, depending on the intent of the query 406, the intent indicator 416 may be something else, as represented by the dashed arrows. Each intent indicator can be correlated in a predefined mapping 500 to a trained machine-learning model, which may be specialized or general. Using the predefined mapping 500, the model selection service 418 can select a trained machine-learning model that corresponds to the intent indicator 416. In this example, "Specialized Model A" has been selected based on its correlation to the intent indicator "01" in the predefined mapping 500.

Continuing with FIG. 4, the videoconferencing system 306 can next provide the relevant portions 412 of the conversation and optionally the query 406 as input to the selected machine-learning model 420. The machine-learning model 420 can generate an output 422 based on the relevant portions 412 and the query 406. For example, if the selected machine-learning model 420 is a summarization model, the machine-learning model 420 can generate an output 422 that includes a summary of the relevant portions 412 of the conversation. If the selected machine-learning model 420 is a sentiment model, the machine-learning model 420 can generate an output 422 that describes the sentiment exhibited by one or more participants during the relevant portions 412 of the conversation. If the selected machine-learning model 420 is a presence model, the machine-learning model 420 can generate an output 422 that indicates whether the selected information is present in the relevant portions 412 of the conversation. And so on. If the selected machine-learning model 420 is a general model, the machine-learning model 420 can attempt to generate an output 422 that satisfies the query 406 based on the relevant portions 412 of the conversation.

After generating the output 422, the videoconferencing system 306 can transmit the output 422 to the user 404. For example, the videoconferencing system 306 can transmit a response 428 to the query 406 to the client device 402, where the response 428 includes the output 422. The client device 402 can receive the response 428 and display the output 422 in the query interface 426. The user 404 can view the query interface 426 to receive the output 422.

In some examples, the query interface 426 can be configured as a chat-like interface, where queries and responses can be presented like a conversation between the user 404 and a fictitious entity, such as an AI assistant (e.g., and AI chatbot). For instance, the user's queries and the videoconferencing system's responses can be presented as chat messages between the user 404 and an AI assistant in the query interface 426, to create the illusion of a textual conversation between the user 404 and the AI assistant. This may improve the user experience.

Figure 6:
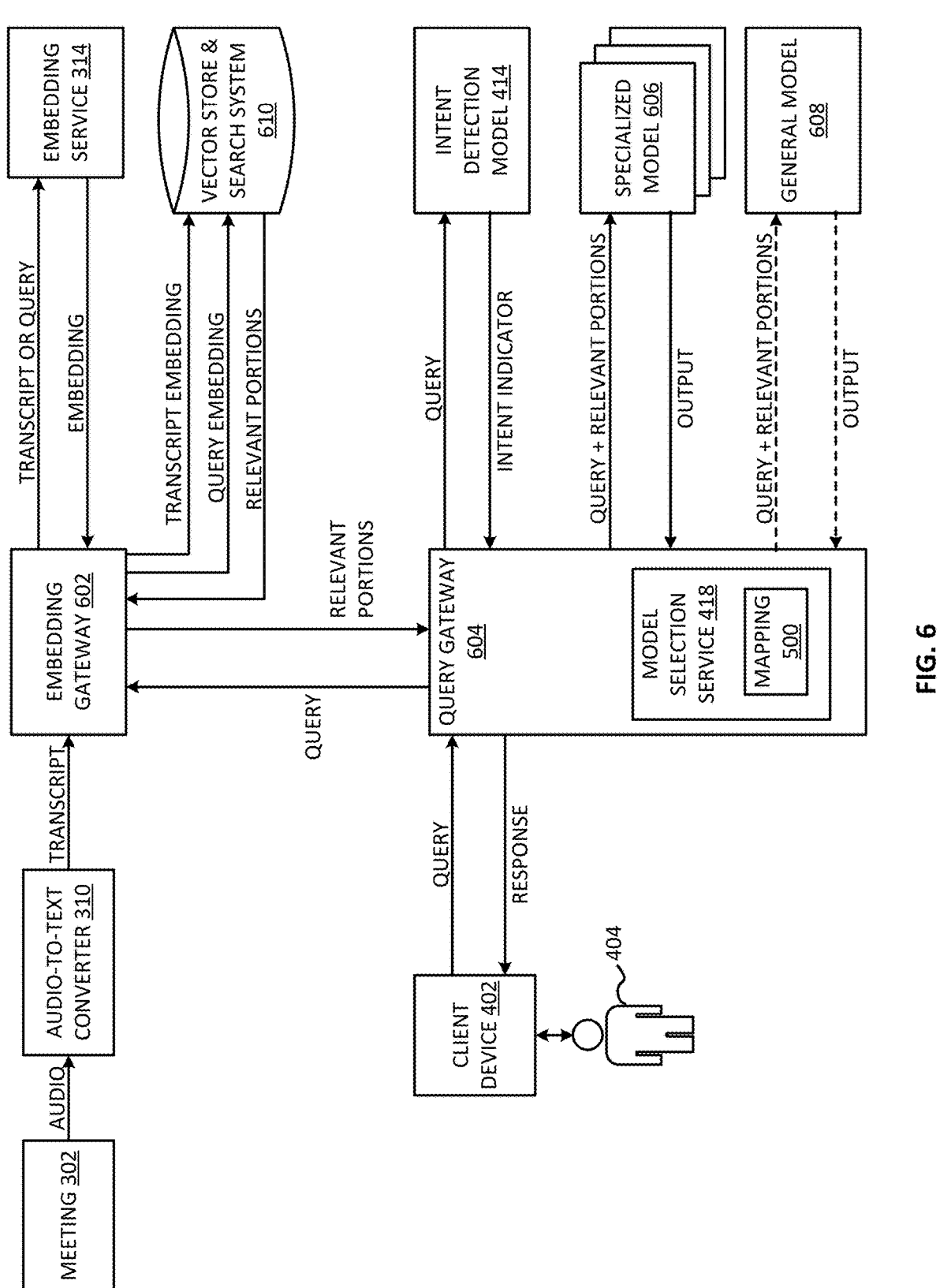
FIG. 6 shows an example of a process for generating a response to a query about a conversation according to some aspects of the present disclosure.

Turning now to FIG. 6, shown is an example of a process for generating a response to a query about a conversation according to some aspects of the present disclosure. The process can involve a system generating audio of a meeting, such as a videoconferencing meeting 302. The audio can then be converted to a text transcript of the meeting using an audio-to-text converter 310. The transcript can be provided to an embedding gateway 602, which can forward the transcript to an embedding service 314. The embedding service 314 can generate an embedding of the transcript, and return the transcript embedding to the embedding gateway 602. The embedding gateway 602 can then store the transcript embedding in a vector storage and search system 610, or another type of database.

Thereafter, a user 404 can operate a client device 402 to submit a query to the system. The query can be received at a query gateway 604, which can forward the query to the embedding gateway 602. The embedding gateway 602 can, in turn, forward the query to the embedding service 314, which can generate an embedding of the query and return the query embedding to the embedding gateway 602. The embedding gateway 602 can then transmit the query embedding to the vector storage and search system 610. The vector storage and search system 610 can determine one or more relevant portions of the conversation based on the query embedding and the stored transcript embedding. The vector storage and search system 610 can then transmit the relevant portions of the conversation to the embedding gateway 602, which can forward them to the query gateway 604 for subsequent use.

The query gateway 604 can also transmit the query to an intent detection model 414, which can output an intent indicator indicating an intent of the query. The intent detection model 414 can provide the intent indicator to the query gateway 604. Based on the intent indicator, the query gateway 604 can determine which model is to be used to generate a response to the query. For example, the query gateway 604 can include or otherwise interact with a model selection service 418 to select a model, from a repository of models, for use in generating a response to the query. The model selection service 418 may employ a mapping 500 (e.g., a lookup table), or any other suitable technique, to select a model from the repository based on the intent indicator. The repository can include any number of specialized models and at least one general model for use in generating responses to queries.

In the example shown in FIG. 6, the model selection service 418 has selected a specialized model 606 for use in generating a response to the query. There may be V specialized models available for selection, as represented in FIG. 6 by multiple boxes underneath the specialized model 606. The model selection service 418 can select one of the available specialized models (e.g., specialized model 606) based on the intent of the query. The query gateway 604 can then transmit the query and/or the relevant portions of the conversation to the specialized model 606, which can generate a corresponding output and provide it back to the query gateway 604. But in other examples, depending on the intent indicator, the query gateway 604 may transmit the query and/or the relevant portions of the conversation to a general model 608, which can generate a corresponding output and provide it back to the query gateway 604.

After the output has been generated by the selected model, the query gateway 604 can generate a response that includes the output. The query gateway 604 can then transmit the response back to the client device 402 for presentation to the user 404.

In the above process, the embedding gateway 602 and the query gateway 604 can orchestrate the interactions between the various components. These gateways 602, 604 can be part of the videoconferencing system 306, along with some or all of the embedding service 314, the vector storage and search system 610, the intent detection model 414, the specialized model 606, and general model 608. Alternatively, in other examples, some or all of the above processes could be performed by another system that is separate from the videoconferencing system. For instance, the videoconferencing system may record the audio of the videoconferencing meeting and provide it to an external system, which may include some or all of the components described above with respect to FIGS. 3-6 and perform some or all of the processes described above with respect to those figures. Thus, in some examples, other types of systems may implement at least some aspects of the present disclosure.

Turning now to FIG. 7, FIG. 7 shows a flowchart of an example of a process for handling a query about a conversation according to some aspects of the present disclosure. Other examples may include more operations, fewer operations, different operations, or a different order of operations than is shown in FIG. 7. The operations of FIG. 7 will now be described with reference to the components of FIGS. 3-5 above.

In block 702, a system (e.g., videoconferencing system 306 or another system) trains an intent detection model 414. For example, the system can apply a supervised learning process to train the intent detection model 414 using training data. The training data can include relationships between sample queries and intents. The training data may include hundreds or thousands of such relationships. Through the training process, weights of the intent detection model 414 can be iteratively adjusted based on the relationships in the training data, to thereby transform an untrained version of the model into the trained intent detection model 414.

In block 704, the system receives a query 406 from a user 404 about a conversation. The system can receive the query 406 via one or more networks, such as the Internet. In some examples, the query 406 can be about a conversation between attendees 304 of a videoconferencing meeting 302.

In block 706, the system determines a relevant portion 412 of the conversation based on the query 406. For example, the system can generate a query embedding 408 based on the query 406. The system can then compare the query embedding 408 to different portions of a transcript embedding 316 (e.g., generated based on a transcript 312 of the conversation) to identify the relevant portion 412.

In block 708, the system determines an intent of the query 406 using an intent detection model 414. For example, the system can provide the query 406 as input to the intent detection model 414, which can generate an output indicating the intent of the query 406. For instance, the output can include an intent indicator 416 indicating the intent of the query 406.

In block 710, the system selects a machine-learning model 420, from among a plurality of trained machine-learning models 424, based on the intent of the query 406 (e.g., the intent indicator 416). This may involve using a predefined mapping 500 that correlates various intents to the various trained machine-learning models 424.

In block 712, the system provides the query 406 and/or the relevant portion 412 of the conversation as input to the selected machine-learning model 420, which generates an output 422 based on those inputs. The output 422 can then be used as part of a response 428 to the query 406.

In block 714, the system transmits the response 428 to the query 406 to the user 404. For example, the system can transmit the response 428 to the client device 402 of the user 404 via one or more networks. The client device 402 can then output the response 428 on a display, for example as part of the query interface 426. In some examples, the user 404 may then submit additional queries and the above process can iterate to produce additional responses, which may also be output in the query interface 426.

Figure 8:
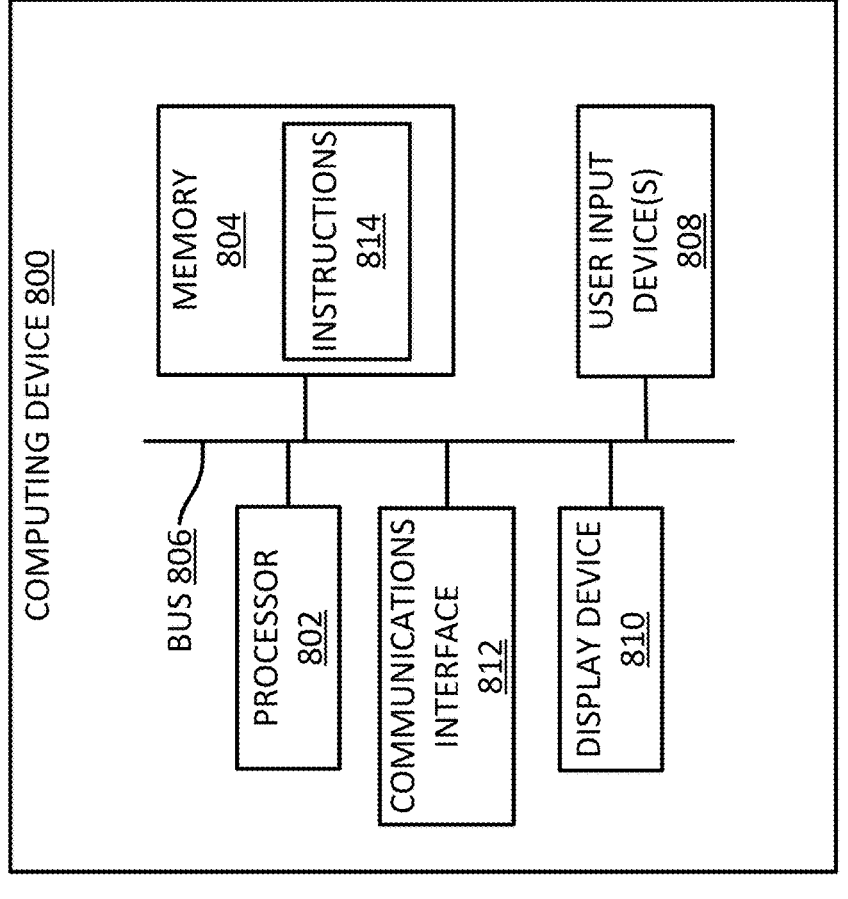
FIG. 8 shows a block diagram of an example of a computing device usable to implement some aspects of the present disclosure.

FIG. 8 shows a block diagram of an example of a computing device 800 usable to implement some aspects of the present disclosure. In some examples, the computing device 800 may correspond to any of the client devices described above, any part of the chat and videoconference providers described above, or any part of the system described above.

The computing device 800 includes a processor 802 that is in communication with the memory 804 and other components of the computing device 800 using one or more communications buses 806. The processor 802 is configured to execute processor-executable instructions 814 stored in the memory 804 to perform one or more processes described herein.

As shown, the computing device 800 also includes one or more user input devices 808 (e.g., a keyboard, mouse, touchscreen, video capture device, and/or microphone) to accept user input and the display device 810 to provide visual output to a user. The computing device 800 further includes a communications interface 812. The communications interface 812 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of computer-readable medium may include, but are not limited to, an electronic, optical, magnetic, or other storage device capable of providing a processor, such as the processor in a videoconferencing server, with processor-executable instructions. Other examples of computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: A method can involve receiving, from a user, a query related to a conversation between attendees of a videoconferencing meeting. The method can involve determining a relevant portion of the conversation that is relevant to the query. The method can involve determining an intent of the query by providing the query as input to an intent detection model, the intent detection model being configured to analyze the query and output an indicator of the intent. The method can involve selecting a machine-learning model from among a plurality of machine-learning models based on the intent of the query. The method can involve providing the relevant portion of the conversation as input to the machine-learning model, the machine-learning model being configured to generate an output based on the relevant portion of the conversation. The method can involve transmitting the output to the user in a response to the query. Some or all of the method can be implemented by one or more processors.

Example #2: The method of Example #1, further comprising, prior to receiving the query: receiving audio of the conversation; and generating a transcript of the conversation by converting the audio to text.

Example #3: The method of Example #2, further comprising: generating a transcript embedding that is a numerical representation of the transcript; and storing the transcript embedding in a database.

Example #4: The method of any of Examples #1-3, further comprising: generating a query embedding that is a numerical representation of the query; and determining the relevant portion of the conversation based on the query embedding and the transcript embedding.

Example #5: The method of any of Examples #1-4, wherein the query is in a natural-language format.

Example #6: The method of any of Examples #1-5, wherein the intent detection model is configured to classify the query into one of a plurality of categories, the plurality of categories corresponding to a plurality of intents, and wherein the indicator specifies a category of the plurality of categories into which the query was classified by the intent detection model.

Example #7: The method of any of Examples #1-6, further comprising: training the intent detection model using training data that includes sample queries labeled with corresponding intents.

Example #8: The method of any of Examples #1-7, wherein the plurality of machine-learning models includes a specialized model and a generic model, the specialized model being trained to perform a specific type of task, and the generic model being a large-language model trained to perform multiple types of tasks.

Example #9: The method of Example #8, further comprising: selecting the specialized model as the machine-learning model based on a predefined mapping that correlates the intent of the query to the specialized model.

Example #10: The method of Example #8, further comprising: selecting the generic model as the machine-learning model based on a predefined mapping that correlates the intent of the query to the generic model.

Example #11: A system comprising one or more processors and one or more memories including program code that is executable by the one or more processors to cause the one or more processors to perform operations. The operations can include receiving, from a user, a query related to a conversation between attendees of a videoconferencing meeting. The operations can include determining a relevant portion of the conversation that is relevant to the query. The operations can include determining an intent of the query by providing the query as input to an intent detection model, the intent detection model being configured to analyze the query and output an indicator of the intent. The operations can include selecting a machine-learning model from among a plurality of machine-learning models based on the intent of the query. The operations can include providing the relevant portion of the conversation as input to the machine-learning model, the machine-learning model being configured to generate an output based on the relevant portion of the conversation. The operations can include transmitting the output to the user in a response to the query.

Example #12: The system of Example #11, wherein the operations further comprise, prior to receiving the query: receiving audio of the conversation; and generating a transcript of the conversation by converting the audio to text.

Example #13: The system of Example #12, wherein the operations further comprise: generating a transcript embedding that is a numerical representation of the transcript; generating a query embedding that is a numerical representation of the query; and determining the relevant portion of the conversation based on the query embedding and the transcript embedding.

Example #14: The system of any of Examples #11-13, wherein the query is in a natural-language format.

Example #15: The system of any of Examples #11-13, wherein the intent detection model is configured to classify the query into one of a plurality of categories, the plurality of categories corresponding to a plurality of intents, and wherein the indicator specifies a category of the plurality of categories into which the query was classified by the intent detection model.

Example #16: The system of any of Examples #11-13, wherein the operations further comprise: training the intent detection model using training data that includes sample queries labeled with corresponding intents.

Example #17: The system of any of Examples #11-13, wherein the plurality of machine-learning models includes a specialized model and a generic model, the specialized model being trained to perform a specific type of task, and the generic model being a large-language model trained to perform multiple types of tasks.

Example #18: The system of Example #17, wherein the operations further comprise: selecting the specialized model as the machine-learning model based on a predefined mapping that correlates the intent of the query to the specialized model.

Example #19: The system of Example #17, wherein the operations further comprise: selecting the generic model as the machine-learning model based on a predefined mapping that correlates the intent of the query to the generic model.

Example #20: A non-transitory computer-readable medium comprising program code that is executable by one or more processors to cause the one or more processors to perform operations. The operations can include receiving, from a user, a query related to a conversation between attendees of a videoconferencing meeting. The operations can include determining a relevant portion of the conversation that is relevant to the query. The operations can include determining an intent of the query by providing the query as input to an intent detection model, the intent detection model being configured to analyze the query and output an indicator of the intent. The operations can include selecting a machine-learning model from among a plurality of machine-learning models based on the intent of the query. The operations can include providing the relevant portion of the conversation as input to the machine-learning model, the machine-learning model being configured to generate an output based on the relevant portion of the conversation. The operations can include transmitting the output to the user in a response to the query.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure.

The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
receiving, by one or more processors and from a user, a query related to a conversation between attendees of a videoconferencing meeting;
determining, by the one or more processors, a relevant portion of the conversation that is relevant to the query;
determining, by the one or more processors, an intent of the query by providing the query as input to an intent detection model, the intent detection model being configured to analyze the query and output an indicator of the intent, wherein the intent detection model is configured to classify the query into one of a plurality of categories, the plurality of categories corresponding to a plurality of intents, and wherein the indicator specifies a category of the plurality of categories into which the query was classified by the intent detection model;
selecting, by the one or more processors, a machine-learning model from among a plurality of machine-learning models based on the intent of the query;
providing, by the one or more processors, the relevant portion of the conversation as input to the machine-learning model, the machine-learning model being configured to generate an output based on the relevant portion of the conversation; and
transmitting, by the one or more processors, the output to the user in a response to the query.

2. The method of claim 1, further comprising, prior to receiving the query:
receiving audio of the conversation; and
generating a transcript of the conversation by converting the audio to text.

3. The method of claim 2, further comprising:
generating a transcript embedding that is a numerical representation of the transcript; and
storing the transcript embedding in a database.

4. The method of claim 3, further comprising:
generating a query embedding that is a numerical representation of the query; and
determining the relevant portion of the conversation based on the query embedding and the transcript embedding.

5. The method of claim 1, wherein the query is in a natural-language format.

6. The method of claim 1, further comprising:
training the intent detection model using training data that includes sample queries labeled with corresponding intents.

7. The method of claim 1, wherein the plurality of machine-learning models includes a specialized model and a generic model, the specialized model being trained to perform a specific type of task, and the generic model being a large-language model trained to perform multiple types of tasks.

8. The method of claim 7, further comprising:
selecting the specialized model as the machine-learning model based on a predefined mapping that correlates the intent of the query to the specialized model.

9. The method of claim 7, further comprising:
selecting the generic model as the machine-learning model based on a predefined mapping that correlates the intent of the query to the generic model.

10. A system comprising:
one or more processors; and
one or more memories including program code that is executable by the one or more processors to cause the one or more processors to perform operations including:
receiving, from a user, a query related to a conversation between attendees of a videoconferencing meeting;
determining a relevant portion of the conversation that is relevant to the query;
determining an intent of the query by providing the query as input to an intent detection model, the intent detection model being configured to analyze the query and output an indicator of the intent, wherein the intent detection model is configured to classify the query into one of a plurality of categories, the plurality of categories corresponding to a plurality of intents, and wherein the indicator specifies a category of the plurality of categories into which the query was classified by the intent detection model;
selecting a machine-learning model from among a plurality of machine-learning models based on the intent of the query;
providing the relevant portion of the conversation as input to the machine-learning model, the machine-learning model being configured to generate an output based on the relevant portion of the conversation; and
transmitting the output to the user in a response to the query.

11. The system of claim 10, wherein the operations further comprise, prior to receiving the query:
receiving audio of the conversation; and
generating a transcript of the conversation by converting the audio to text.

12. The system of claim 11, wherein the operations further comprise:
generating a transcript embedding that is a numerical representation of the transcript;
generating a query embedding that is a numerical representation of the query; and
determining the relevant portion of the conversation based on the query embedding and the transcript embedding.

13. The system of claim 10, wherein the query is in a natural-language format.

14. The system of claim 10, wherein the operations further comprise:
training the intent detection model using training data that includes sample queries labeled with corresponding intents.

15. The system of claim 10, wherein the plurality of machine-learning models includes a specialized model and a generic model, the specialized model being trained to perform a specific type of task, and the generic model being a large-language model trained to perform multiple types of tasks.

16. The system of claim 15, wherein the operations further comprise:

selecting the specialized model as the machine-learning model based on a predefined mapping that correlates the intent of the query to the specialized model.

17. The system of claim 15, wherein the operations further comprise:

selecting the generic model as the machine-learning model based on a predefined mapping that correlates the intent of the query to the generic model.

18. A non-transitory computer-readable medium comprising program code that is executable by one or more processors to cause the one or more processors to perform operations including:

receiving, from a user, a query related to a conversation between attendees of a videoconferencing meeting;

determining a relevant portion of the conversation that is relevant to the query;

determining an intent of the query by providing the query as input to an intent detection model, the intent detection model being configured to analyze the query and output an indicator of the intent, wherein the intent detection model is configured to classify the query into one of a plurality of categories, the plurality of categories corresponding to a plurality of intents, and wherein the indicator specifies a category of the plurality of categories into which the query was classified by the intent detection model;

selecting a machine-learning model from among a plurality of machine-learning models based on the intent of the query;

providing the relevant portion of the conversation as input to the machine-learning model, the machine-learning model being configured to generate an output based on the relevant portion of the conversation; and transmitting the output to the user in a response to the query.

\* \* \* \* \*